US011112135B2

(12) United States Patent
Burns et al.

(10) Patent No.: US 11,112,135 B2
(45) Date of Patent: Sep. 7, 2021

(54) MAINTENANCE PROCEDURE UPDATING IN HVAC SYSTEM SERVICE LOG

(71) Applicant: Johnson Controls Technology Company, Auburn Hills, MI (US)

(72) Inventors: Jonathan A. Burns, Wichita, KS (US); Theresa N. Gillette, Wichita, KS (US); Tyler P. McCune, El Dorado, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/195,510

(22) Filed: Nov. 19, 2018

(65) Prior Publication Data

US 2020/0149761 A1 May 14, 2020

Related U.S. Application Data

(60) Provisional application No. 62/757,970, filed on Nov. 9, 2018.

(51) Int. Cl.
*F24F 11/30* (2018.01)
*G05B 19/048* (2006.01)
(Continued)

(52) U.S. Cl.
CPC .............. *F24F 11/30* (2018.01); *F24F 11/50* (2018.01); *F24F 11/64* (2018.01); *G05B 19/048* (2013.01);
(Continued)

(58) Field of Classification Search
CPC .. F24F 11/30; F24F 11/64; F24F 11/50; F24F 2140/60; G05B 19/048; G05B 2219/2614; G06Q 10/20
See application file for complete search history.

(56) References Cited

U.S. PATENT DOCUMENTS 5,481,481 A * 1/1996 Frey ................. G05B 19/41845
702/82
2002/0143421 A1* 10/2002 Wetzer ............. G06Q 10/06314
700/100
(Continued)

FOREIGN PATENT DOCUMENTS

| EP | 2966886 | 1/2016 |
|---|---|---|
| WO | 2007066166 | 6/2007 |
| WO | 2014067504 | 5/2014 |

OTHER PUBLICATIONS

Said, Anis Ben, et al. "Experts' knowledge renewal and maintenance actions effectiveness in high-mix low-volume industries, using Bayesian approach." Cognition, Technology & Work 18.1 (2016): 193-213. (Year: 2016).*

(Continued)

*Primary Examiner* — Michael D Masinick
(74) *Attorney, Agent, or Firm* — Fletcher Yoder, P.C.

(57) ABSTRACT

A tangible, non-transitory, machine-readable medium includes instructions that, when executed by a processor, cause the processor to determine an active operating condition of the heating, ventilation, and/or air conditioning (HVAC) system based on the active operating data related to the HVAC system, retrieve an existing service log having a maintenance procedure corresponding to the active operating condition of the HVAC system, and record an entry service log. The entry service log includes the active operating data, the active operating condition, and an updated version of the maintenance procedure corresponding to the active operating condition.

24 Claims, 9 Drawing Sheets

(51) Int. Cl.
*G06Q 10/00* (2012.01)
*F24F 11/64* (2018.01)
*F24F 11/50* (2018.01)
*F24F 140/60* (2018.01)

(52) U.S. Cl.
CPC .......... *G06Q 10/20* (2013.01); *F24F 2140/60* (2018.01); *G05B 2219/2614* (2013.01)

(56) References Cited

U.S. PATENT DOCUMENTS

| | | | | |
|---|---|---|---|---|
| 2004/0193467 | A1* | 9/2004 | Williams | G06Q 10/04 |
| | | | | 705/7.24 |
| 2013/0154839 | A1* | 6/2013 | Barton | F24F 12/001 |
| | | | | 340/584 |
| 2014/0040807 | A1* | 2/2014 | Heard | G06F 3/0484 |
| | | | | 715/771 |
| 2014/0074730 | A1* | 3/2014 | Arensmeier | F24F 11/30 |
| | | | | 705/305 |
| 2014/0350989 | A1* | 11/2014 | Telatar | G06Q 10/1097 |
| | | | | 705/7.21 |
| 2015/0066782 | A1 | 3/2015 | Vainberg et al. | |
| 2015/0081161 | A1* | 3/2015 | Chapman | G06Q 10/08 |
| | | | | 701/31.5 |
| 2015/0339634 | A1* | 11/2015 | Xiao | G06Q 10/20 |
| | | | | 705/7.13 |
| 2016/0210569 | A1* | 7/2016 | Enck | G06Q 10/0637 |
| 2016/0307120 | A1 | 10/2016 | Ortega et al. | |
| 2016/0328945 | A1* | 11/2016 | Greisser | F24F 11/30 |
| 2017/0301154 | A1 | 10/2017 | Rozint | |
| 2017/0352245 | A1* | 12/2017 | Maher | H04L 63/1425 |
| 2018/0173217 | A1* | 6/2018 | Spiro | G05B 23/0235 |
| 2018/0275630 | A1* | 9/2018 | Kao | H04L 41/5041 |
| 2019/0295331 | A1* | 9/2019 | Amit | G07C 5/08 |

OTHER PUBLICATIONS

Barber, J R. Centralized maintenance procedures. United States: N. p., 1994. Web. (Year: 1994).*

Abbas Javed et al. "Smart Random Neural Network Controller for HVAC Using Cloud Computing Technology," Feb. 2017, pp. 351-360 vol. 13, No. 1, IEEE.

* cited by examiner

MAINTENANCE PROCEDURE UPDATING IN HVAC SYSTEM SERVICE LOG

CROSS REFERENCE TO RELATED APPLICATIONS

This application claims priority from and the benefit of U.S. Provisional Application Ser. No. 62/757,970, entitled "HVAC SYSTEM SERVICE LOG", filed Nov. 9, 2018, which is hereby incorporated by reference in its entirety for all purposes.

BACKGROUND

The disclosure relates generally to heating, ventilation, and/or air conditioning (HVAC) systems, and specifically, to a system for storing information to assist with servicing HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) systems are utilized in residential, commercial, and industrial applications to control environmental properties, such as temperature and humidity, for occupants of respective environments. The HVAC system may control the environmental properties through control of an airflow delivered to and ventilated from spaces conditioned by the HVAC system. For example, the HVAC system may transfer heat between the airflow and refrigerant flowing through the system. Services may be performed on the HVAC system, and certain information, such as a manufacturer's guide for performing common services, may be stored on a database associated with the HVAC system to facilitate performance of services. However, the stored information may not include sufficient information to complete certain services.

SUMMARY

In one embodiment, a tangible, non-transitory, machine-readable medium includes instructions that, when executed by a processor, cause the processor to determine an active operating condition of the heating, ventilation, and/or air conditioning (HVAC) system based on the active operating data related to the HVAC system, retrieve an existing service log having a maintenance procedure corresponding to the active operating condition of the HVAC system, and record an entry service log. The entry service log includes the active operating data, the active operating condition, and an updated version of the maintenance procedure corresponding to the active operating condition.

In another embodiment, a heating, ventilation, and/or air conditioning (HVAC) system, includes a computing device. The computing device is configured to determine an active operating condition of the HVAC system based on active operating data associated with the HVAC system, create a first service log in response to determining the active operating condition, retrieve a second service log based on the active operating condition, and record the first service log. The second service log includes previous operating data of an additional HVAC system, a previous operating condition of the additional HVAC system, and a previous maintenance procedure corresponding to the previous operating condition, and the first service log includes the active operating data, the active operating condition, and an updated version of the previous maintenance procedure corresponding to the active operating condition.

In another embodiment, heating, ventilation, and/or air conditioning (HVAC) system includes a computing device configured to receive active operating data associated with the HVAC system, determine an active operating condition of the HVAC system based on the active operating data, retrieve an existing service log of a plurality of service logs, and record an entry service log. The existing service log includes a maintenance procedure corresponding to the active operating condition of the HVAC system, and the entry service log includes the active operating data, the active operating condition, and an updated version of the maintenance procedure corresponding to the active operating condition.

DRAWINGS

Various aspects of this disclosure may be better understood upon reading the following detailed description and upon reference to the drawings in which.

Figure 7:
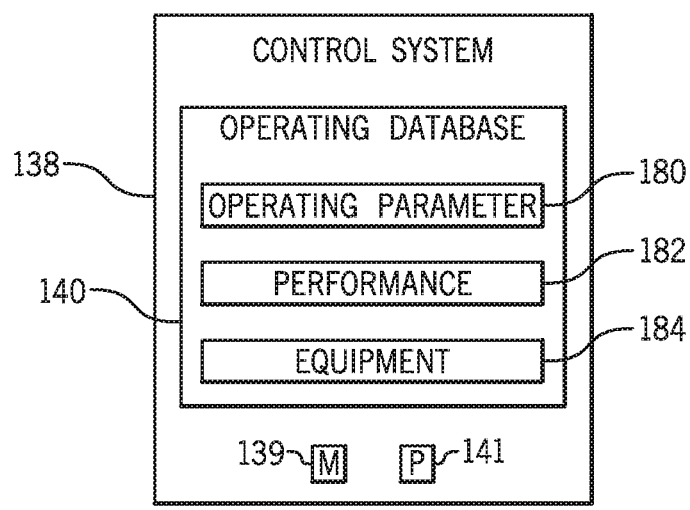
FIG. 7 is a schematic of an embodiment of an operating database that may be used by any of the systems of FIGS. 1-4 to store information associated with operation of the systems, in accordance with an aspect of the present disclosure.
Figure 8:
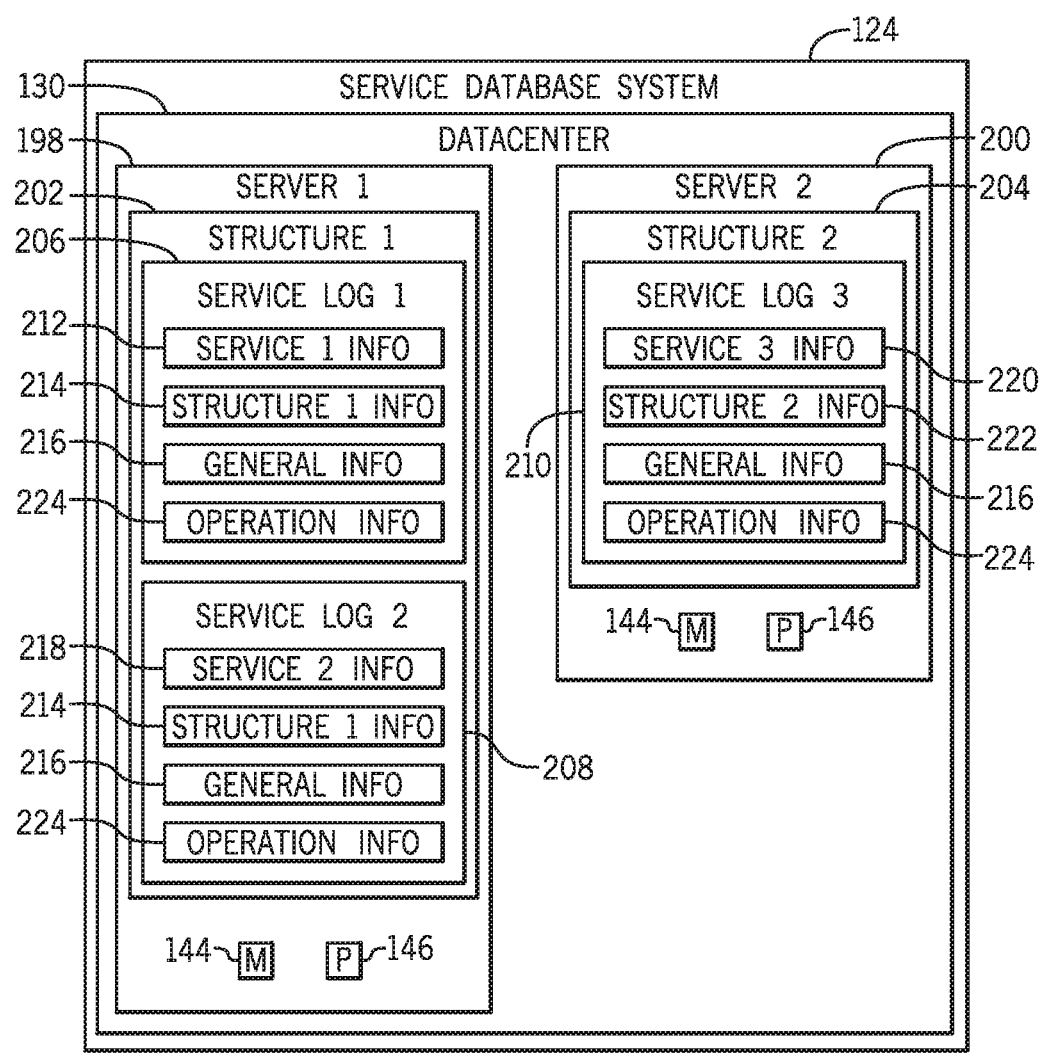
Figure 9:
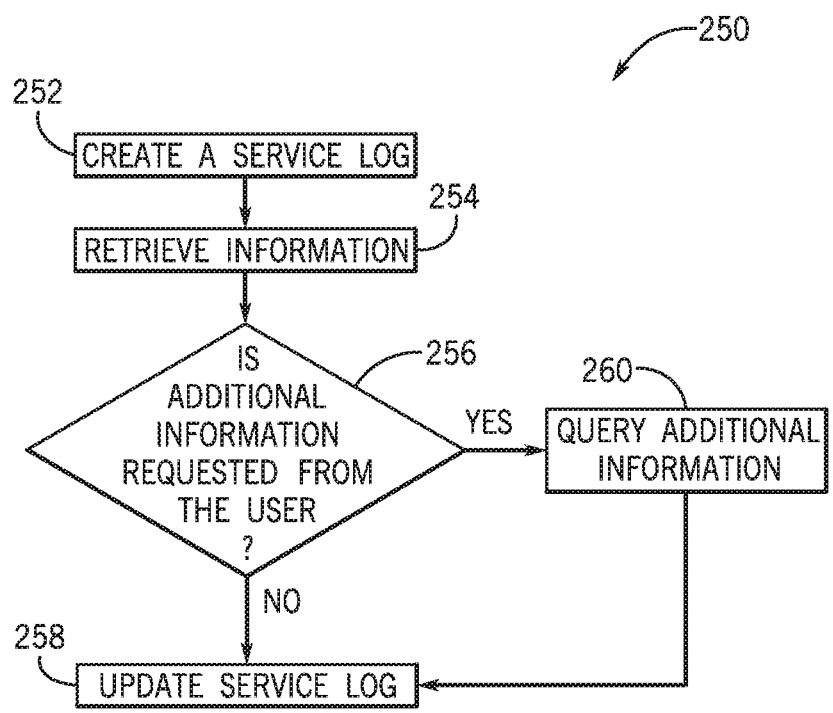

FIG. 8 is a schematic of an embodiment of a service database system that may be used by any of the systems of FIGS. 1-4 to store relevant information for servicing the systems, in accordance with an aspect of the present disclosure; and FIG. 9 is a flowchart of an embodiment of a method of servicing any of the systems of FIGS. 1-4 using the database of FIG. 7, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilation, and/or air conditioning (HVAC) systems that may use a database to store information relevant to performing services on the HVAC systems. For example, the database may be a cloud database accessible to a user. In another example, the database may be information stored in a cloud, such as via virtual servers or storage. As used herein, a user refers to an owner of an HVAC system, a manufacturer of an HVAC system, and/or someone performing a service or maintenance on the HVAC systems, including a technician, a group of technicians, or a company employing a technician. The database may include information to assist with providing a service to an HVAC system, such as system operating information, maintenance and/or service procedures, and so forth. The information may include procedures, tasks, and/or steps that are frequently used for successfully completing services and/or equipment information related to the HVAC system, such as information provided by original equipment manufacturers (OEMs). Thus, users may access the database to more efficiently and/or effectively perform a service on an HVAC system.

In some cases, a user may encounter an operating condition, such as a fault or inefficient operation, of an HVAC system that cannot be sufficiently remedied or addressed by information in the database. In other words, the database may not include materials or information that relate to the specific operating condition and/or to correcting or improving the operating condition. In such situations, the user may still be able to complete a service, such as via contacting the OEM, via prior knowledge of the user, and/or via technical help resources. In certain traditional systems, after the user resolves the service matter, relevant information to facilitate other users to perform the same service on other HVAC systems may not be distributed or otherwise made available, such as to future users. In other words, a user may encounter a previously-existing operating condition when servicing an HVAC system, and the user may contact the OEM and/or another resource for assistance, even though a different user may have already successfully completed the same or a substantially similar service. The OEM and/or another resource may not be sufficiently familiar with the specific service in question and/or may not readily possess relevant information at hand to assist with the service. Thus, in general, contacting the OEM and/or another resource for assistance in servicing HVAC systems may increase a time and a cost for completing the service to the HVAC system.

Thus, in accordance with certain embodiments of the present disclosure, it is presently recognized that there is a need for a database system that may be dynamically updated to facilitate servicing of HVAC systems. Specifically, after performing a service, a user may update the database system by providing information associated with the service performed on the HVAC system, such as a service procedure performed and/or any other relevant information. Thus, after the database is updated, other users may reference the newly provided information, such as via a computing device. Additionally, users may be able to edit existing information, such as by amending information, correcting information, commenting on information, and/or reviewing information, which may enable other users to better utilize information stored on the database and successfully complete a service on an HVAC system. In this manner, the database system may improve an efficiency of data or information management. For example, the database system enables data or information to be transmitted between multiple devices or systems without a need for intermediate equipment or additional action to be partaken by the user. Furthermore, the database system may enhance organization of data or information. That is, the computing device may retrieve certain information when requested by the user, as opposed to providing a default amount or list of information. As such, an amount of information being processed by the computing device may be limited, thereby limiting a processing power and/or reducing a retrieval time of the computing device. Moreover, the information may be readily available and/or quickly accessible via the computing device when requested by the user.

Figure 1:
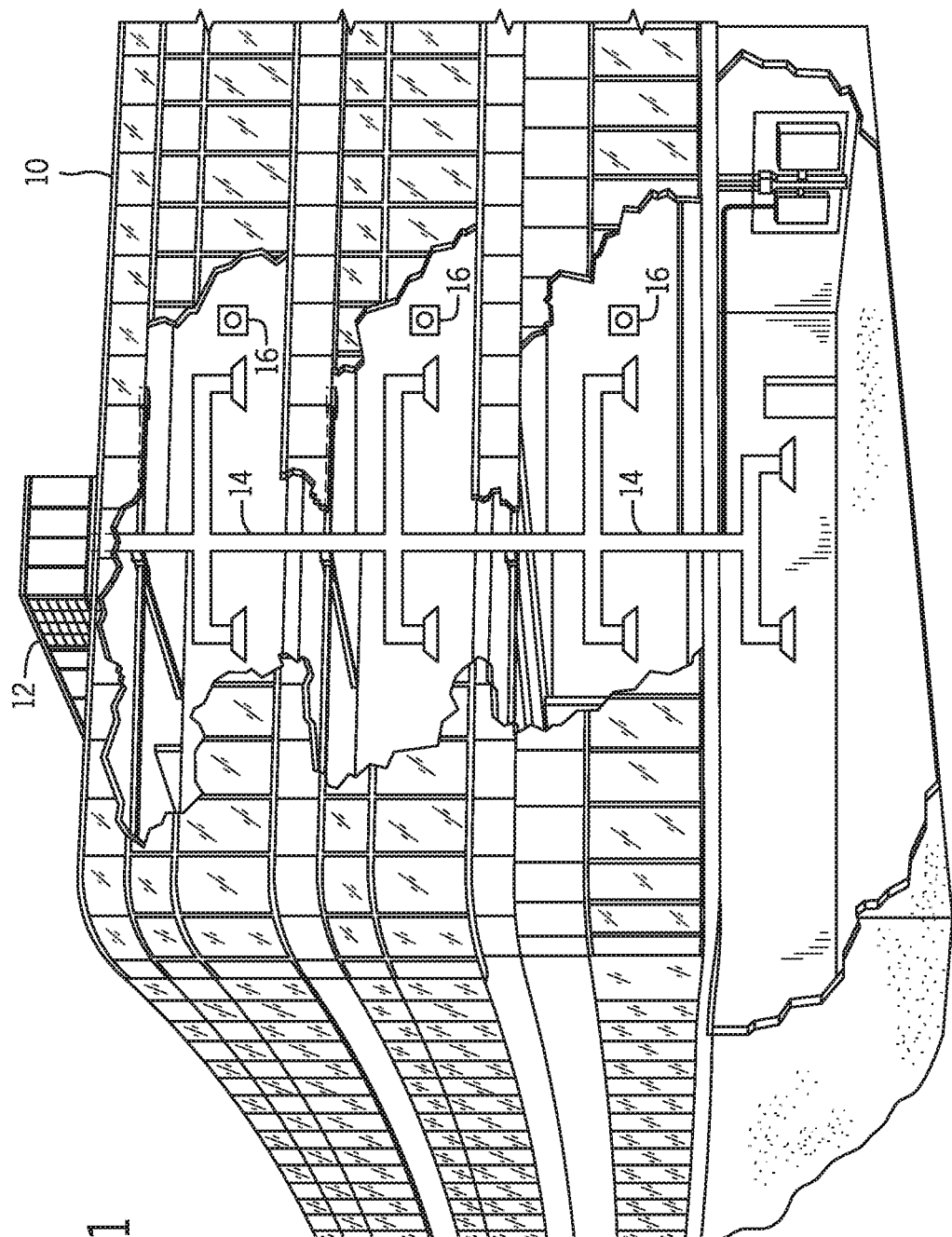
FIG. 1 is a schematic of an embodiment of an environmental control system that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
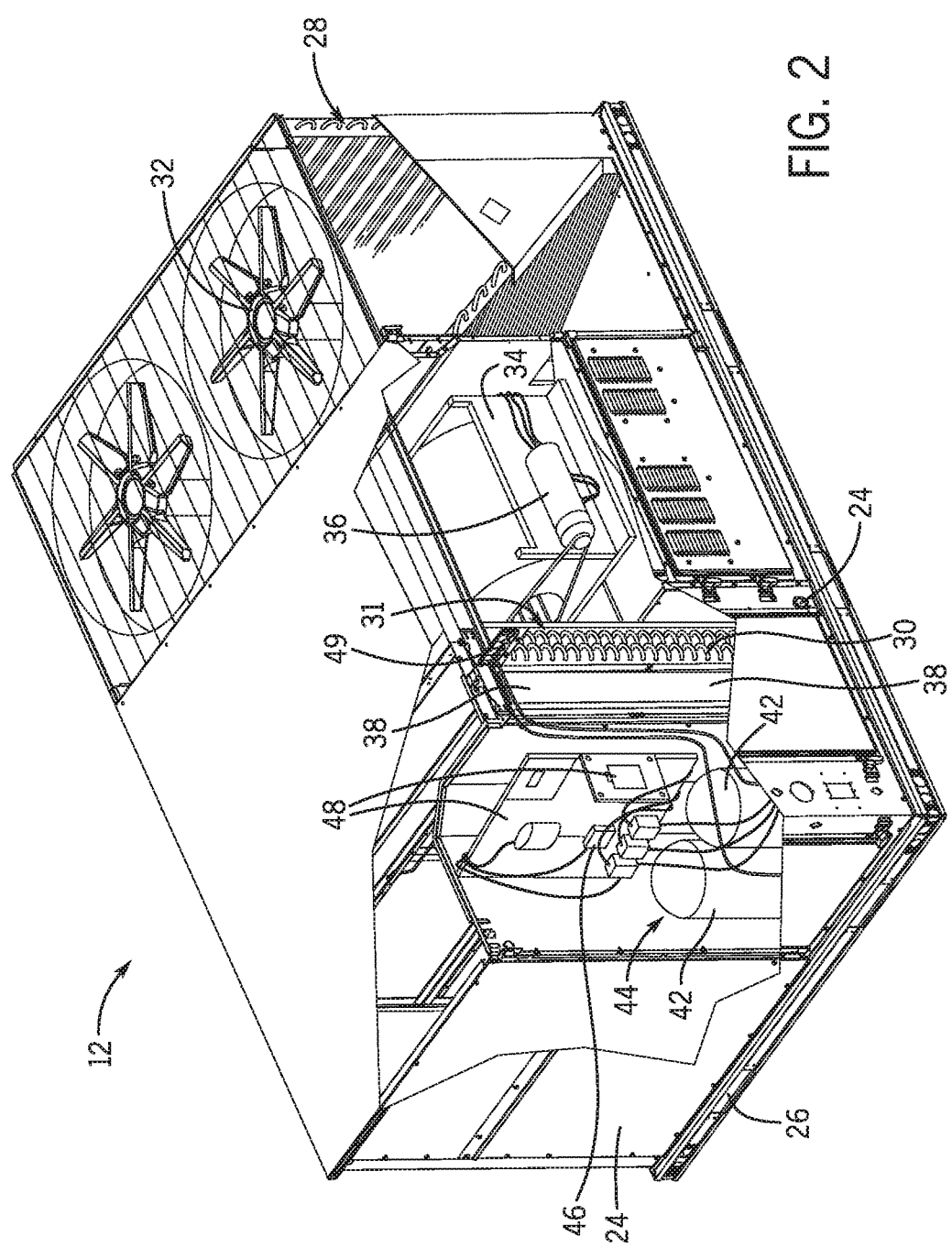
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
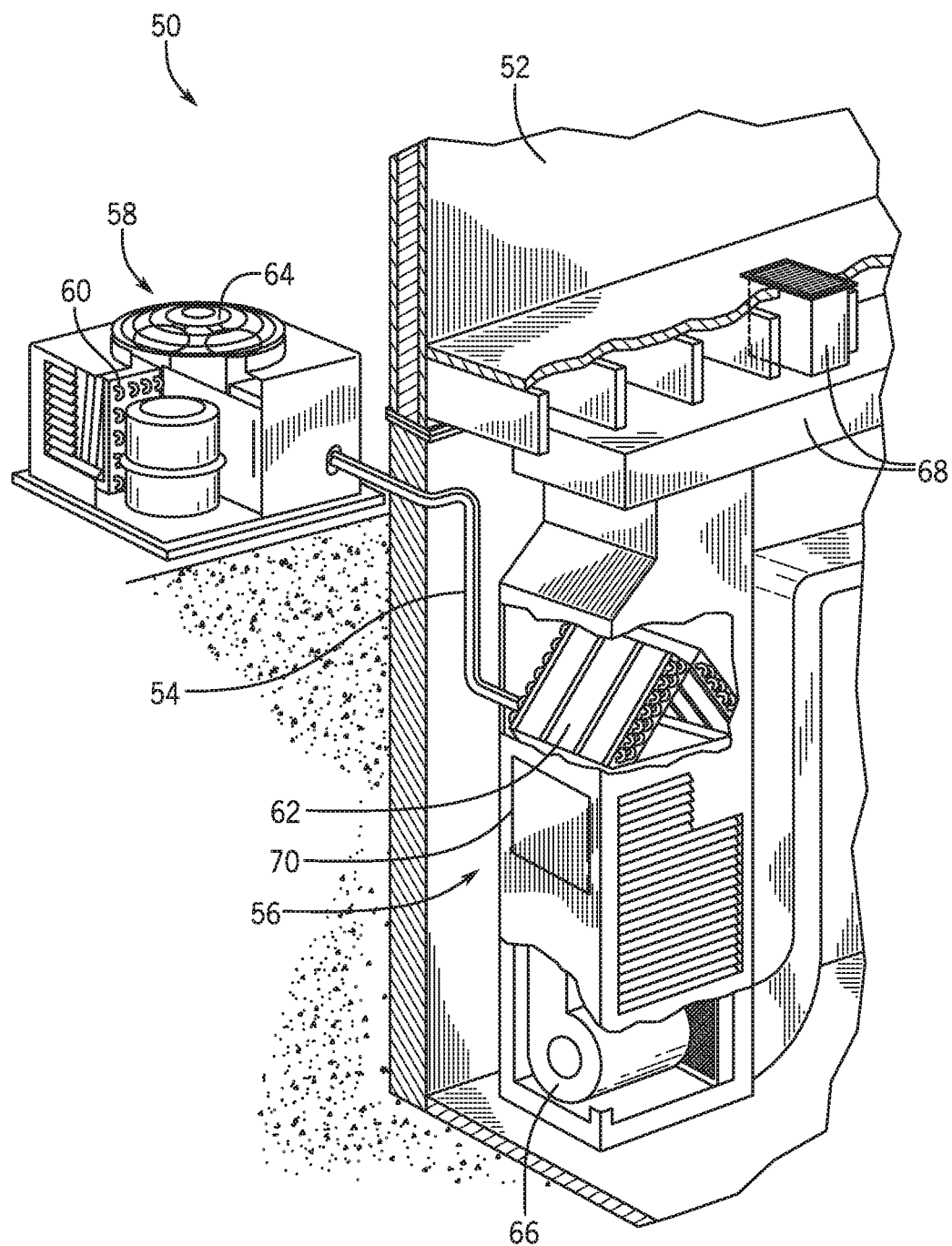
FIG. 3 is a schematic of an embodiment of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
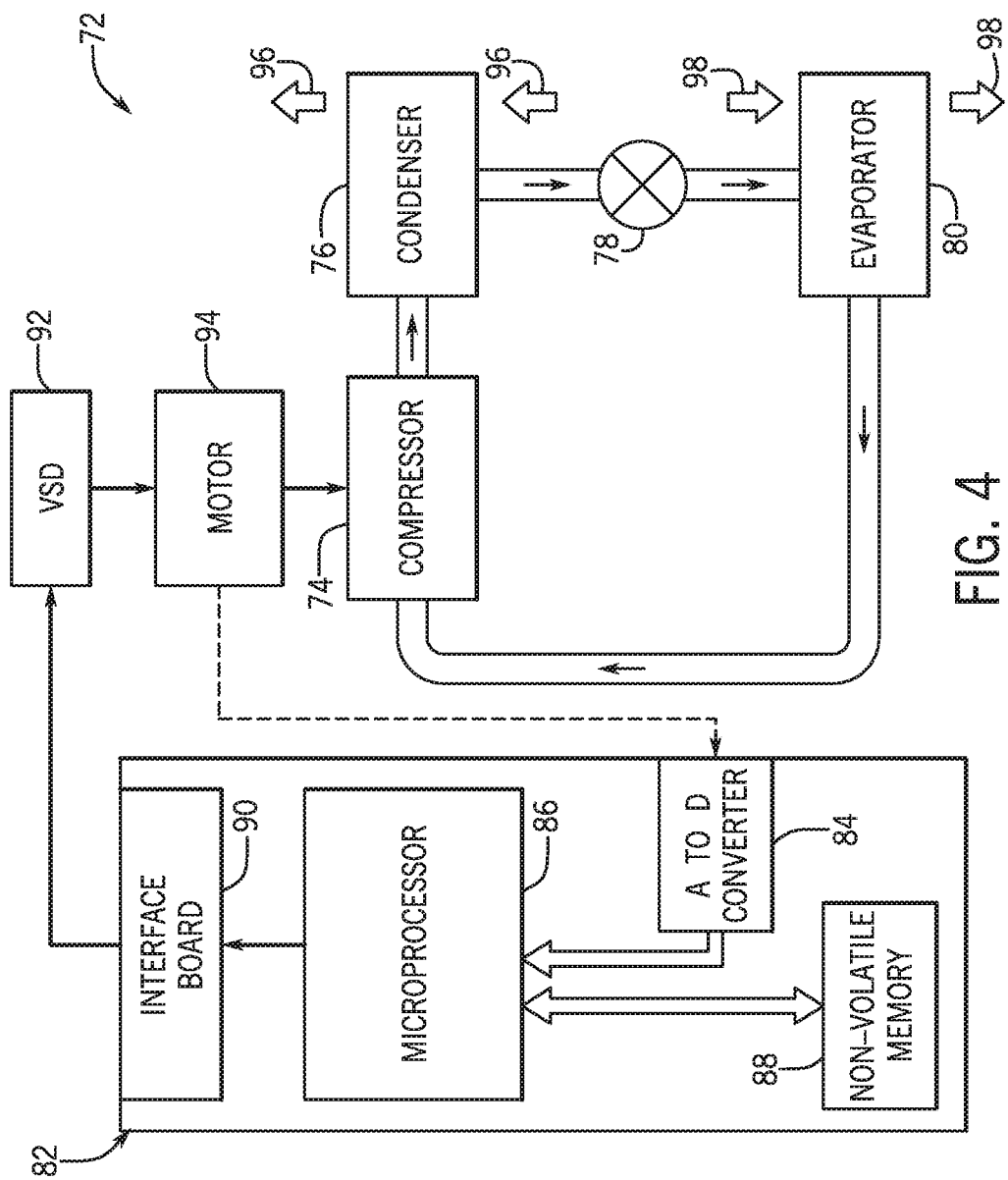
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

An HVAC system may be associated with or in communication with an operating database system configured to store operational data associated with the HVAC system. The operational data may include performance information, equipment information, system parameters, and/or other relevant information related to the HVAC system that may enable a user to determine an operating condition of the respective HVAC system. As used herein, an "operating condition" refers to a status or other quality or characteristic of the HVAC system, such as the existence of a fault or error, a shutdown condition of the HVAC system, inefficient operation of the HVAC system, or another status of the HVAC system. The operating database may be updated after performance of a service on the HVAC system to include any new information related to the status of the HVAC system resulting from the performed service. As described herein, a service may refer to any adjustment made to the HVAC system to attempt to maintain, improve, or otherwise change a performance of the HVAC system. A service may include maintenance of components, replacement of components, adjustment of components, adjustment of HVAC system settings, and so forth.

The HVAC system may also be associated with a service database system that stores certain information that may be relevant when performing a service on the HVAC system, including general equipment information and/or information associated with various service procedures. The service database system may be updated after performance of each service to provide newly acquired information that may facilitate performance of future services. In some embodiments, the service database system may include information that may be associated with a variety of service procedures, HVAC equipment, and so forth. The information may be pre-stored, or stored in the service database upon installation of the HVAC system, and may be generally applicable to performance of a service on different types of HVAC systems. As described herein, pre-stored information includes information that has been stored in a database or database system prior to performance of a service and/or creation of service logs, which may include general information related to the HVAC system and/or information associated with a particular structure conditioned by the HVAC system.

Additionally, certain information associated with the HVAC system may be created during or after completion of a service. In other words, the information may be saved in a database system during or after completion of the service. The information may be specific to the HVAC system being serviced and may include information associated with the particular service performed. In some embodiments, the information may be included a service log of the HVAC system. Each time a service is performed on the HVAC system, an entry service log associated with the HVAC system may be added into the operating database and/or the service database. As should be understood, each service log may include information, such as the type of service being performed, when a service was last performed on the HVAC system, resources used to facilitate the service, operating data relevant to the HVAC system performance or operating condition, a location of the service or the HVAC system, operating conditions of an environment surrounding a structure associated with the HVAC system, and so forth. Thus, the entry service log may include information associated with the current or active operating data and/or the current or active operating condition determined based on the current or active operating data. As such, when subsequent services are to be performed on the HVAC system, a user may access the service database to retrieve existing service logs for general information regarding services performed on similar HVAC systems, as well as information regarding previous services performed on the HVAC system. In addition to the addition of service log entries, the user may add information related to a service matter not previously described in the service database. The user may also modify pre-stored information, such as to clarify and/or correct previously-stored procedures for performing a service. In this manner, information in the service database may be updated to facilitate subsequent performance of services to the HVAC system or other similar HVAC systems. In general, each time a user performs a service on an HVAC system, the user may enter a service log and/or update information in the operating database and/or the service database. As such, other users may subsequently reference the service log and/or updated information to better perform future services.

In certain embodiments, the service database may also include contact information of users, such as users that previously performed services on the HVAC system. The service database may also include information related to the users, such as how long the user has worked for an employer, what services the user has performed, certifications or special knowledge that the user possesses, and/or other suitable criteria. Thus, a user may directly contact another user based on information related to the other user. In this manner, users may avoid contacting entities, such as an OEM, that may not possess information relevant to particular services. Instead, a user may be able to communicate with another user that may have performed a service on similar HVAC systems to facilitate performance of the service.

As will be appreciated, the operating database and/or the service database may be cloud databases in communication with an electronic device, such as a mobile phone, tablet, or other computing device, of a user. That is, users performing services on the HVAC system may be able to access the operating database and/or the service database and reference information stored on the respective databases. Additionally, when a user updates information stored on the service database, other users may be able to view the information with the incorporated updates. Users may also be able to review information, such as previous maintenance procedures, and provide details on the applicability and/or usefulness of the information. By way of example, users may provide comments, feedback, and/or ratings to information, including pre-stored information and/or information added by other users. In this manner, users may determine the value of information on the service database, which may further facilitate performance of future services by enabling a user to search for information rated highly by other users or otherwise deemed more valuable than other information. Furthermore, although this disclosure primarily discusses the operating database and the service database as separate databases, in other embodiments, a single database system may store both operating data and information associated with performing a service on the HVAC system.

Figure 5:
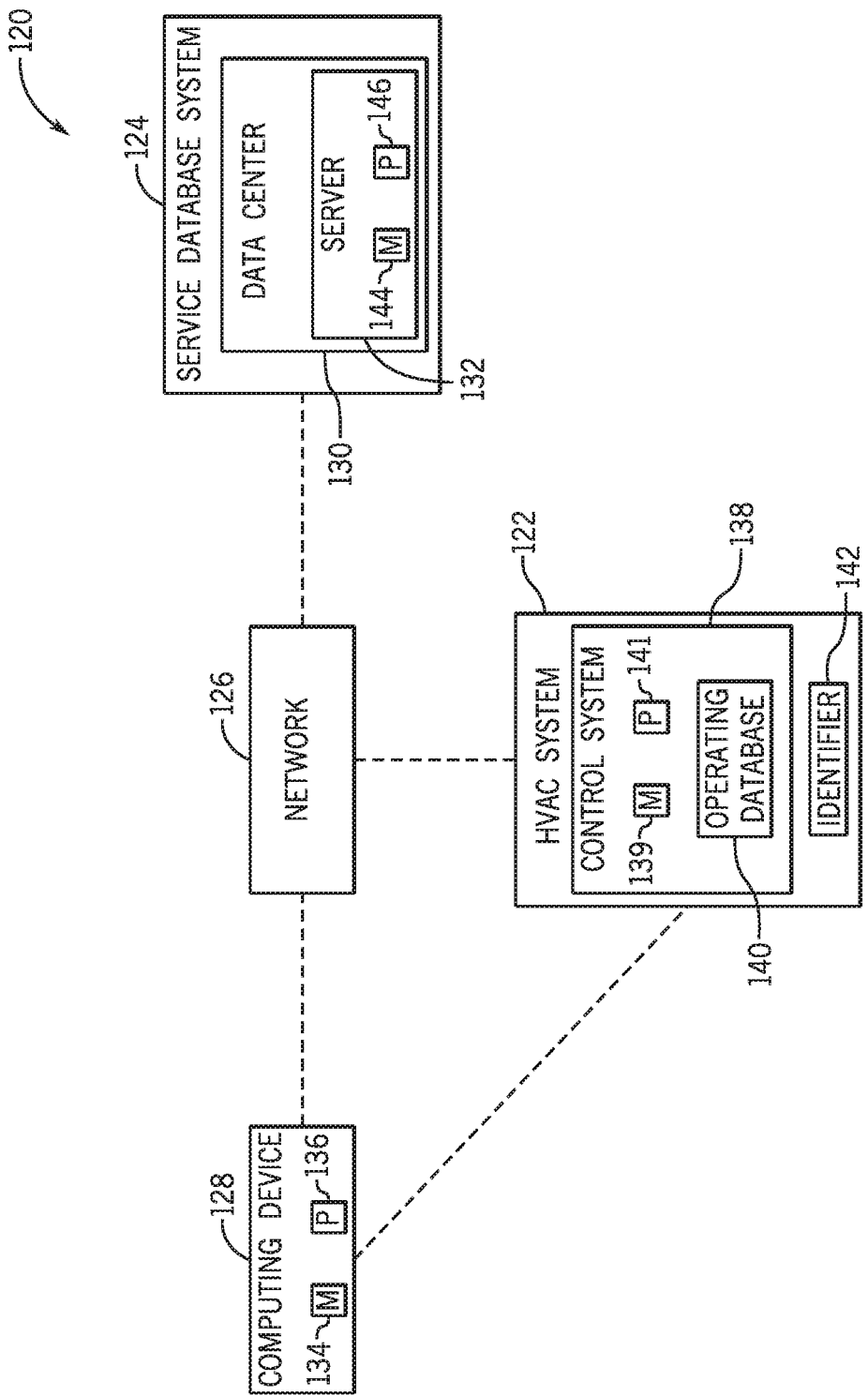
FIG. 5 is a block diagram of an embodiment of a computing system to manage information associated an HVAC system, in accordance with an aspect of the present disclosure

FIG. 5 is a block diagram illustrating an embodiment of a computing system 120 that may enable management of information associated with an HVAC system 122, such as the HVAC unit 12 of FIGS. 1 and 2 and/or the residential heating and cooling system 50 of FIG. 3. The computing system 120 may include a service database system 124 and computing devices 128 that communicate with one another via a network 126, such as the Internet. The service database system 124 may further include a plurality of data centers 130, each having stored information, such as information associated with several HVAC systems 122. The stored information of the plurality of data centers 130 may be managed by servers 132 of the data center 130. For example, each server 132 may be configured to collect store, process, distribute, or otherwise manage a portion of the information in the service database system 124. Each server 132 may be implemented on a physical component, such as a physical computing device, and may include database servers and/or application servers. The network 126 may place each computing device 128 of the plurality of computing devices 128 in communication with one another and/or with the service database system 124. For example, the network 126 may enable each computing device 128 to access the service database system 124 and retrieve information stored on the service database system 124. To this end, the network 126 may include components, such as routers and/or wires, that transport information. In some embodiments, the network 126 may be a private network in which a certain number of computing devices 128, such as computing devices 128 that have been granted approval, may access the service database system 124.

Each computing device 128 may include a memory 134 and a processor 136. The memory 134 may be a mass storage device, a flash memory device, removable memory, or any other non-transitory computer-readable medium that includes instructions. The memory 134 may also include volatile memory such as randomly accessible memory (RAM) and/or non-volatile memory such as hard disc memory, flash memory, and/or other suitable memory formats. The processor 136 may execute instructions stored in the memory 134, such as instructions to access and/or modify information in the service database system 124. Generally, each computing device 128 may be used to perform an operation related to accessing, retrieving, storing, modifying, manipulating, or otherwise using information stored on the service database system 124. In some embodiments, the computing device 128 may be a mobile device separate from the HVAC system 122, such as a tablet, mobile phone, a computer, another suitable device, or any combination thereof, that uses an application or software to perform an operation. As such, the user may remotely access the service database system 124 using the computing device 128 via the network 126. In additional or alternative embodiments, the computing device 128 may be a part of the HVAC system 122, such as an operating control panel of the HVAC system 122, a master thermostat of the HVAC system 122, and the like, which may be configured to access the service database system 124.

As will be appreciated, the HVAC system 122 may be communicatively coupled to the service database system 124 and/or the computing device 128 via the network 126 and/or another suitable connection. For example, the HVAC system 122 may include a control system 138 that includes a memory 139 and a processor 141 that each operate similarly to the memory 134 and the processor 136. The memory 139 and the processor 141 may be configured to control operation of the HVAC system 122. That is, the processor 141 may operate the HVAC system 122 based on instructions stored in the memory 139. Additionally, the processor 141 may place the HVAC system 122 in communication with the computing device 128. For example, the control system 138 of the HVAC system 122 may include an operating database 140 that may be stored in the memory 139, in which the operating database 140 stores information associated with operation or operating conditions of the HVAC system 122. The control system 138, such as via the processor 141, may be configured to send information stored in the operating database 140 to the service database system 124 via the network 126. As an example, the processor 141 may send information stored in the operating database 140 that includes an operating status, operating parameters, an operating condition, and the like, associated with the HVAC system 122.

Furthermore, the HVAC system 122 may include an identifier 142 that may be recognized, identified, scanned, or otherwise input and/or received into the computing device 128. Generally, the identifier 142 enables the computing device 128 to determine an identity of the particular HVAC system 122 and to use the determined identity to retrieve information from the service database system 124 relevant to the particular HVAC system 122. In certain embodiments, the identifier 142 may be disposed on the HVAC system 122. For example, the identifier 142 may be a quick response (QR) located on a thermostat of the HVAC system 122. The computing device 128 may scan the QR code to recognize the particular HVAC system 122. Upon scanning the QR code, the computing device 128 may identify the HVAC system 122 and retrieve information based on the identity from the service database system 124 via the network 126.

It should also be understood that the service database system 124 may also include a memory 144 and a processor 146, such as located within each server 132. The processor 146 of each server 132 may perform actions on information stored in the service database system 124 based on instructions stored in the memory 144. That is, the processor 146 of each server 132 may be configured to transmit information from the service database system 124 to the computing devices 128 and/or the HVAC system 122 and/or receive information from the computing devices 128 and/or the HVAC system 122. Additionally or alternatively, the processors 146 may be configured to analyze and/or process information stored on the service database system 124, such as to determine if a particular service is frequently being performed. Furthermore, the processor 146 may be configured to modify information stored on the service database system 124, such as in response to a signal transmitted by the computing device 128 and/or the HVAC system 122.

Figure 6:
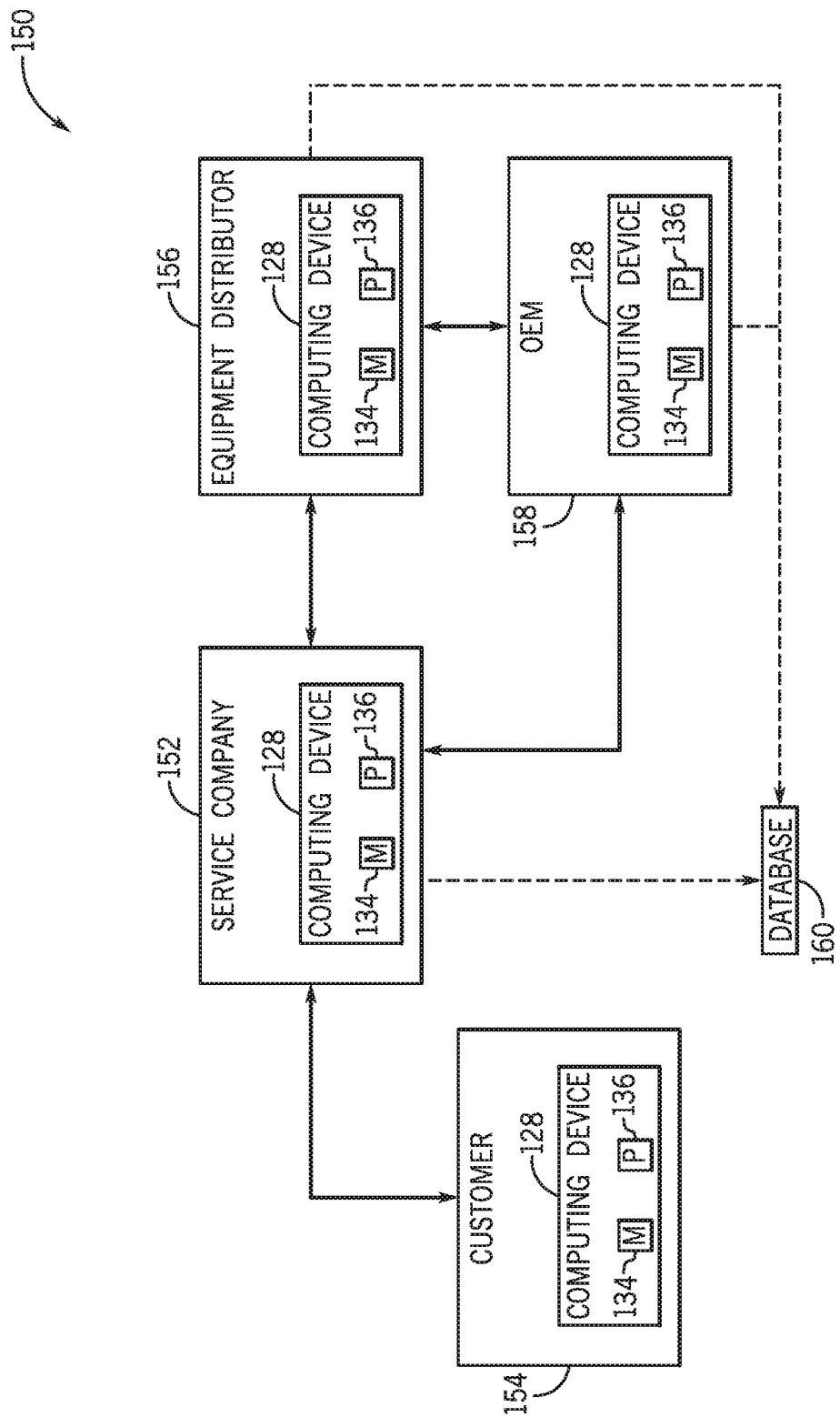
FIG. 6 is a block diagram of an embodiment of a network for servicing any of the systems of FIGS. 1-4, in accordance with an aspect of the present disclosure.

FIG. 6 is a block diagram illustrating an embodiment of a service network 150 that may be used when a service is performed on the HVAC system 122. That is, the service network 150 depicts communicative relationships between respective computing devices, which may each be a computing device of the plurality computing devices 128. For instance, the computing devices 128 may be controlled or otherwise operated by a service company 152, a customer 154, an equipment distributor 156, and an original equipment manufacturer (OEM) 158. In the illustrated embodiment, the computing device of the customer 154 that owns or operates the HVAC system 122 may be in communication with the computing device 128 of the service company 152 that performs a service to the HVAC system 122. The customer 154 may be an individual person, a group of people, or an organization that requests a service to be performed on the HVAC system 122. For example, the customer 154 may be an individual requesting service on the residential heating and cooling system 50 of FIG. 3. The customer 154 may also be a business organization, for example, requesting service on the HVAC unit 12 of FIG. 1. In some embodiments, the computing device 128 of the customer 154 may communicate with the computing device 128 of the service company 152 to request a service, such as via the network 126 and/or via a wireless network, by generating and/or sending a notification to the computing device 128 of the service company 152 indicative of a service request. In additional or alternative embodiments, the service company 152 may be prompted to service an HVAC system 122 without communicating with the customer 154. For example, the service company 152 may be scheduled to service certain HVAC systems 122 at a particular time, such as a particular day, month, year, and so forth.

When a service is requested by the customer 154, a ticket or service request may be generated by the service company 152. The ticket may represent a particular request and/or a particular condition of an HVAC system 122 and may include information that may be tracked by the service company 152 to determine a status of the request. For example, the ticket may include information related to an estimated time for performing a service, an indication that the service was completed successfully, a notification that further assistance is desired to complete the request, another status of the request, or any combination thereof. The ticket may also include certain information associated with the request to enable the service company 152 to distinguish between multiple tickets for the same or different HVAC systems 122. For example, the ticket may include a location of the respective HVAC system 122, an operating condition of the respective HVAC system 122, a time that the request was sent by the customer 154, a time that the ticket was generated, a time that servicing was performed in response the ticket, a description of the service and/or the request, any other information relevant to performing the service on the HVAC system 122, or any combination thereof.

To perform the service, the service company 152 may assign a user, such as a technician, to the location of the HVAC system 122 for each generated ticket. As described in this example, the user is associated with the service company 152, but it should be understood that in some embodiments, the user may be independent of the service company 152, and thus, may be a separate member in communication with the service network 150. In certain embodiments, the user may be able to modify tickets, such as update information included in the tickets. Indeed, rather than being assigned a ticket, a user may be able to generate a ticket, to update information associated with the ticket in view of a completed service, and/or to submit tickets to the service company 152 on behalf of the customer 154 and/or the HVAC system 122 to be serviced.

The service company 152 may be able to view all submitted tickets that are associated with the users employed by the service company 152 and/or customers 154 of the service company 152, to determine the status of each ticket and to assign a ticket to a specific user. The service company 152 may also view the tickets and analyze information associated with each ticket, such as a completion time for each service, whether the maintenance was performed successfully, and so forth. By using the information associated with each ticket, the service company 152 may better assign a user to subsequent tickets. For example, the service company 152 may use the information associated with each ticket to determine the skill of each user for performing a particular service. If available information indicates that a particular known or identified user is especially familiar with or apt at completing a particular service, the service company 152 may assign the particular user more tickets involving that particular service.

In certain embodiments, the computing device 128 of the service company 152 may be in communication with the computing device 128 of an equipment distributor 156. As described herein, an equipment distributor 156 may distribute components manufactured by the OEM 158. The service company 152 may communicate with the equipment distributor 158 for certain service matters, such as replacement of certain components of the HVAC system 122. By way of example, the service company 152 may send tickets that users employed by the service company 152 have difficulty completing, and thus, may request assistance from the equipment distributor 156. The equipment distributor 156 may possess more familiarity with particular components of the HVAC system 122 than the users of the service company 152, and as such, may assist the users and/or the service company 152 with performing a service on such components. Additionally, the service company 152 may notify the equipment distributor 156 of recurring service requests for specific components or HVAC systems 122. As such, the equipment distributor 156 may analyze a specific component/system to determine whether the specific component/system has a fault that is causing frequent service requests.

In certain embodiments, the computing device 128 of the service company 152 and/or the computing device 128 of the equipment distributor 156 may be in communication with the computing device 128 of the OEM 158. For example, the service company 152 and/or the equipment distributor 156 may send tickets to request assistance from the OEM 158. The OEM 158, as manufacturers of components of the HVAC system 122, may possess even greater familiarity with the components than the service company 152 and/or the equipment distributor 156, and thus, may be able to provide further assistance to the user and/or the service company 152 in completing a service to the HVAC system 122. In this manner, the OEM 158 may receive tickets when the equipment distributor 156 is unfamiliar with a maintenance procedure and/or is otherwise unable to provide assistance to the service company 152. Additionally, the OEM 158 may be able to view all or a portion of the information associated with tickets performed by the service company 152 and/or the equipment distributor 156. For example, the OEM 158 may receive information related to specific components/systems that may be serviced most frequently and/or what services are frequently being requested. The OEM 158 may use the information associated with the tickets to adjust manufacturing procedures and/or techniques for producing certain components/systems. For example, the OEM 158 may determine that a particular heat exchanger is frequently serviced due to reduced performance of the heat exchanger. The OEM 158 may then analyze the particular heat exchanger to determine if the design and/or manufacturing process of the heat exchanger may be adjusted to improve the performance of the heat exchanger.

Each of the respective computing devices 128 of the service company 152, the equipment distributor 156, and/or the OEM 158 may be in communication with a database system 160, such as the operating database 140 and/or the service database system 124 described above. In other words, the service company 152, the equipment distributor 156, and/or the OEM 158 may access the database system 160 to view information, including previous operating data and/or service information, via the respective computing devices 128. In certain embodiments, the service company 152, the equipment distributor 156, and/or the OEM 158 may have limited access to the database system 160. That is, the service company 152, the equipment distributor 156, and/or the OEM 158 may each access different portions of information stored on the database system 160. For example, access to the database system 160 for the users employed by the service company 152 may be limited to operating data for the particular HVAC system 122 that is being serviced and/or service procedures that may be relevant for performing the service on the HVAC system 122.

Although the service network 150 illustrates particular interactions between the respective computing devices 128 of the service company 152, the customer 154, the equipment distributor 156, and the OEM 158, it should be understood that there may be additional or alternative interactions occurring in the service network 150. For example, in some embodiments, the computing device 128 of the customer 154 may be able to communicate with the computing device 128 of the equipment distributor 156 and/or the computing device 128 of the OEM 158. Additionally or alternatively, there may be additional members of the service network 150 that are not currently illustrated in the embodiment of FIG. 6. Additionally, it should be understood that the members of the service network 150 may include different capabilities than described in this disclosure. In one instance, rather than the service company 152 generating the ticket in response to a request for service to an HVAC system 122, a ticket may, additionally or alternatively, be generated by the customer 154.

FIG. 7 is a schematic of an embodiment of the operating database 140, which may be accessible to certain entities of the service network 150. The illustrated embodiment shows examples of information that may be stored in the operating database 140. In general, the operating database 140 of each HVAC system 122 may store operating data related to the respective HVAC system 122. For example, the operating database 140 may store information associated with an operating parameter 180 of the HVAC system 122, a performance 182 of the HVAC system 122, equipment 184 included in the HVAC system 122, other relevant information pertaining to the HVAC system 122, or any combination thereof.

As should be understood, the operating parameter 180 may include any parameter associated with operation of the HVAC system 122, such as a temperature of a space conditioned by the HVAC system 122, an air flow rate output by the HVAC system 122, an ambient temperature, a temperature or a pressure of a working fluid or refrigerant flowing through the HVAC system 122, a temperature or a pressure within a component of the HVAC system 122, a speed of a compressor of the HVAC system 122, a speed of a fan of the HVAC system 122, a power input to the HVAC system 122 or a portion of the HVAC system 122, a position of a valve of the HVAC system, another suitable parameter, or any combination thereof. Furthermore, the performance 182 of the HVAC system 122 includes data associated with an efficiency of operation of the HVAC system 122, which may include energy consumption, a heating or cooling rate, a duration of operation, other suitable information related to efficiency, or any combination thereof. In certain embodiments, the information associated with the equipment 184 of the HVAC system 122 may include particular models, types, positions within the respective HVAC system 122, and/or characteristics of the individual components installed in the HVAC system 122. In additional or alternative embodiments, the information associated with the equipment 184 may include a condition, a parameter, or other information associated with the operation of individual components of the HVAC system 122. The data indicative of operating parameters 180, performance 182, and/or equipment 184 stored in the operating database 140 may be recorded at various intervals, such that the data may be tracked or analyzed over time.

As will be appreciated, information stored within the operating database 140 may be transmitted via the processor 141 of the control system 138. For example, the computing device 128 may detect the identifier 142, thereby enabling the processor 141 to communicate with the computing device 128 and transmit information stored in the operating database 140 to the computing device 128. In certain embodiments, the information stored in the operating database 140 may also be transmitted to the service database system 124 via the network 126. For example, as the HVAC system 122 operates, the processor 141 may continuously transmit information from the operating database 140 to the service database system 124 either directly or through the computing device 128. It should be understood that the operating database 140 may primarily include information associated with a single HVAC system 122, whereas the data center 130 of the service database system 124 may include information associated with a plurality of HVAC systems 122.

FIG. 8 illustrates a block diagram of an embodiment of the service database system 124 and shows examples of information that may be stored on the service database system 124. As mentioned above, the user may refer to information stored in the service database system 124 to facilitate performance of a service on the HVAC system 122, such as when information retrieved from the operating database 140 is not sufficient. The service database system 124 may be a cloud database and include information associated with various HVAC systems 122, which may each be utilized for conditioning a structure or environment located in different geographical areas. For example, a first server 198 of the service database system 124 may include information associated with a first structure 202 and a second server 200 of the service database system 124 may include information associated with a second structure 204. In other embodiments, the information associated with the first structure 202 and the information associated with the second structure 204 may be stored on the same server 132. In some embodiments, the service database system 124 includes multiple servers 132 that are each located within the same datacenter 130. It should be appreciated that the first structure 202 and the second structure 204 may each be conditioned by different types of HVAC systems 122. The first structure 202 and the second structure 204 may also be different types of structures and may be located in different geographical areas. For example, the first structure 202 may be a commercial structure located in a first geographical area that is conditioned by an embodiment of the HVAC unit 12. The second structure 204 may be a residential structure located in a second geographical area that is conditioned by an embodiment of the residential heating and cooling system 50. While FIG. 7 depicts the service database system 124 as including information associated with the first structure 202 and the second structure 204, it should be understood that the service database system 124 may include information associated with any number of structures.

The service database system 124 may store information specific for each of the structures 202, 204. In certain embodiments, the service database system 124 may be accessed by a user performing a service on an HVAC system 122, such as when the user is assigned to a ticket. A service log associated with the structure may be created when a service is performed by the user. For example, a first service log 206 associated with a first service performed on an HVAC system 122 that conditions the first structure 202 is created by a first ticket, and a second service log 208 associated with a second service performed on the HVAC system 122 that conditions first structure 202 is created by a second ticket. The first service and the second service may have been performed at different times and/or by different users. Additionally, the first service and the second service may have been performed on different HVAC systems 122 associated with the first structure 202. Further, a third service log 210 associated with a third service performed on the HVAC that conditions second structure 204 may be created by a third ticket. In this manner, when a ticket is generated, a service log may be created, in which the service log is added to the service database system 124 and is associated with the particular structure that is conditioned by the HVAC system 122 for which the particular service is performed. Thus, the service database system 124 may include several different associated service logs for each structure, in which each service log is created and added to the service database system 124 when a different ticket is generated. Although this disclosure primarily associates service logs 206, 208, 210 with structures 202, 204, it should be understood that other service logs may additionally or alternatively be assigned to an HVAC system 122, a component of the HVAC system 122, and/or any other suitable device to be serviced.

Each respective service log 206, 208, 210 may include substantially similar categories of information. As illustrated in FIG. 8, the first service log 206 may include information or data 212 associated with the first service, information or data 214 associated with the first structure 202, and general information or data 216. As used herein, general information 216 may include relevant information that is not specifically associated with the particular structure 202, 204, HVAC system 122, or service. For example, the general information 216 may include information associated with certain components of a variety of different types of HVAC systems 122 and/or information associated with various service procedures, such as standard service procedures that may be performed on a given HVAC system 122. The second service log 208 may include information 218 associated with the second service, information 214 associated with the first structure 202, and the general information 216. The third service log 210 may include information 220 associated with the third service, information 222 associated with the second structure 204, and the general information 216. Additionally, each of the servers 198, 200 may be configured to store operation info 224, which may be received from the operating database 140. That is, the respective processors 141 of the control systems 138 of different HVAC systems 122 may be configured to transmit operating information 224 of the respective HVAC systems to the service database system 124. As such, the operating information may include information associated with the operating parameter 180, the performance 182, and/or the equipment 184 as described in FIG. 7.

In some embodiments, the respective processors 146 of the first server 198 and the second server 200 may be configured to perform actions on information stored in the respective memories 144. For example, each processor 146 may be configured to transmit information from the respective server 198, 200 to the computing devices 128, to the HVAC system or systems 122, or to another server 198, 200. Additionally or alternatively, each processor 146 may be configured to modify data stored on the respective servers 198, 200. In one example, the processor 146 of the first server 198 may receive a signal transmitted from a certain computing device 128 indicating that information, such as information associated with the general information 216, should be modified. As a result, the processor 146 of the first server 198 may modify the general information 216 stored in the first server 198 based on the signal. Furthermore, in some embodiments, the processor 146 of the second server 200 may also modify the general information 216 stored in the second server 200 in response to the modification of the general information 216 performed by the processor 146 of the first server 198.

As described herein, information 212, 218, 220 associated with a service may include information associated with the corresponding service performed by a user. The information 212, 218, 220 associated with the service may include information generated by the customer 154, such as information associated with a particular service matter, a particular component to be serviced, and/or a time of service. The information 212, 218, 220 associated with the service may also include information generated by the service company 152, such as maintenance procedures performed, updates to a maintenance procedure, other information used by a user or service company 152 during performance of the service, and/or a time of completion. The information associated with the service may further include information associated with an HVAC system 122 at a time that service is to be performed, including operating data and an operating condition of the HVAC system 122. The operating data may include any relevant operating parameter of the HVAC system 122 that is relevant to the service, including energy consumption of the HVAC system 122, power to operate a component of the HVAC system 122, a position of a component of the HVAC system 122, a property of a working fluid of the HVAC system 122, a property of an airflow through the HVAC system 122, another relevant operating parameter, or any combination thereof. The operating condition may include any determined status of the HVAC system 122 and/or a component of the HVAC system 122 based on the operating data of the HVAC system 122.

Information 212, 218, 220 associated with the service may also include any other information associated with the service and may be generated by any of the members of the service network 150. Since information 212, 218, 220 associated with the service pertains to a particular service, the information associated with other services performed on the same structure, such as the information 212 associated with the first service for the first structure 202 and the information 214 associated with the second service for the first structure 202, may be substantially different from one another, even if such information is associated with the same structure. Indeed, different information associated with different services may include particular information relevant to each respective service, and therefore, may include different information from one another.

Information 214, 222 associated with each respective structure 202, 204 may include information associated with consistent or infrequently varying characteristics pertaining to the structure 202, 204 to be serviced, which may be received upon installation of each HVAC system 122 conditioning the structure 202, 204. As an example, the information associated with each respective structure 202, 204 may include a location, the number of HVAC systems 122 conditioning the structure 202, 204, the type of each HVAC system 122, components of each HVAC system 122, a physical condition of the structure 202, 204 and/or each HVAC system 122 conditioning the structure 202, 204, operation information associated with the structure 202, 204 and/or each HVAC system 122 conditioning the structure, a number of services previously performed on the structure 202, 204, a description of previous services performed on the structure 202, 204, and/or any other relevant information associated with the corresponding structure 202, 204. Additionally or alternatively, information 214, 222 may include information stored in the respective operating databases 140, as transmitted by the respective HVAC systems 122. Thus, the information 214 associated with the first structure 202 may be substantially different than the information 222 associated with the second structure 204. In certain embodiments, different service logs of the same structure may include information 214, 222 associated with the particular structure that is substantially the same. That is, the information 214 associated with the first structure 202 in the first service log 206, for example, may be substantially the same as the information 214 associated with the first structure 202 in the second service log 208, even though the information 214 associated with the first structure 202 may be included in different service logs 206, 208.

In additional or alternative embodiments, the information 214, 222 associated with a structure may be modified. For example, a member of the service network 150, such as the service company 152, may update certain information 214, 222 associated with the structure 202, 204 based on a performed service. In other words, when an HVAC system 122 of the structure 202, 204 is serviced, the service may change certain information 214, 222 associated with the structure 202, 204, such as information associated with the components of each HVAC system 122 conditioning the structure 202, 204. A member of the service network 150 may modify the information 214, 222 associated with the structure 202, 204 to reflect the changes incurred. In this manner, the first service log 206 may include information 214 associated with the first structure 202 at a time when the first service is performed. After the first service is completed, the information 214 associated with the first structure 202 may be modified. When a subsequent second service is performed, the information 214 associated with the first structure 202 may include the modifications that were made after completion of the first service.

In addition to information 212, 218, 220 associated with the service and information 214, 222 associated with the structures 202 204, each service log may include general information 216. In certain embodiments, the general information 216 may be substantially the same for each service log 206, 208, 210 and for each structure 202, 204. For example, the general information 216 associated with the first service log 206 of the first structure 202, the general information 216 associated with the second service log 208 of the first structure 202, and the general information 216 associated with the third service log 210 of the second structure 204 may each be substantially the same. However, as with information associated with the structures 202, 204, the general information 216 may also be modified and/or updated after a service is performed. Thus, in certain embodiments, the respective general information 216 of different service logs may include different information based on the general information 216 stored in the service database system 124 at the time that the service is performed.

In some embodiments, a corresponding service log may be created and stored in the service database system 124 when a ticket is generated. Each service log includes the information 212, 218, 220 associated with the corresponding service, the information 214, 222 associated with the corresponding structure, and/or the general information 216. In particular embodiments, the processor 136 may use information associated with the ticket to determine and/or extract the information 212, 218, 220 associated with the service. Additionally, the processor 136 may retrieve and/or access information 214, 222 associated with the structure 202, 204 and the general information 216 stored on the service database system 124 to generate the service log. The information 212, 218, 220 associated with the service, the information 214, 222 associated with the structure 202, 204, and/or the general information 216 may then be associated with the corresponding service log 206, 208, 210. For example, the processor 136 may identify information included in or associated with the ticket, such as a particular service requested by the customer 154, and store the information, such as the information 214, 222 associated with the structures 202, 204, in the corresponding service log 206, 208, 210.

The service company 152 may access the service log 206, 208, 210 via the service database system 124 when a service is being performed. By way of example, a user of the service company 152 may access the service log 206, 208, 210 and receive the corresponding information 212, 218, 220 associated with the service, the corresponding information 214, 222 associated with the structure, and the general information 216. As previously described, the service company 152 may use the information in the service database system 124, such as the general information 216, to assist with performance of a service. Additionally, the service company 152 may also modify the information to reflect a successfully completed service, which may assist with performance of future services. After a service is completed, the corresponding service log 206, 208, 210 may be stored in the service database system 124 and corresponding modifications, such as to the information 214, 222 associated with the structure and the general information 216, may also be incorporated. In other words, the service log 206, 208, 210 may reflect modifications to information stored in the service database system 124. The modifications may be incorporated into the service database system 124 to enable subsequent service logs to include the modified information.

It should be appreciated that the service database system 124 may include a different architecture than depicted in FIG. 8. For example, the service database system 124 may include additional information not illustrated in FIG. 8, such as additional information in each service log 206, 208, 210. It should also be understood that each service log 206, 208, 210 may include different information from one another. That is, service logs 206, 208, 210 may include, for example, a different set of information for different types of services performed and/or different types of structures in which a service is performed. Further, service logs 206, 208, 210 may include different general information 216 based on a type of HVAC system 122 or systems that condition the respective structure 202, 204. As previously noted, members of the service network 150 may possess limited access to information in the service database system 124. That is, certain members may be able to view certain portions of information in the service database system 124, but not all of the information in the service database system 124. Likewise, some members may be able to modify certain information in the service database system 124, but not other information in the service database system 124.

FIG. 9 is a flowchart illustrating an embodiment of a method 250 for using the service database system 124 when performing a service on an HVAC system 122, for example. The method 250 may be performed by a user assigned to a ticket that is generated based on a request by the customer 154 for performing the service on the HVAC system 122. The user may perform the method 250 at any point in the service process, which may include a time period between when the user is assigned to the ticket and when the ticket is closed and the service is completed. As previously described, a service log may be created in the service database system 124 upon generation of the ticket, as indicated at block 252. In some embodiments, the service log may be created via a user input. For example, a user may input the identifier 142 via the computing device 128. In additional or alternative embodiments, the service log may be created automatically. For example, the service database system 124 may receive active operating data, such as via sensors of the HVAC system 122, and determine an active operating condition of the HVAC system 122 based on the active operating data. As a result of the determined operating condition, a service log associated with performance of a maintenance service to address the operating condition may be created.

Upon creating the service log, certain information associated with the service may be retrieved from the service database system 124, as indicated at block 254. As noted above, the service database system 124 may include several existing service logs, in which each existing service log may include information that may be available as a reference when performing a service on the HVAC system 122. For example, the user may reference other existing service logs to retrieve information regarding relevant maintenance procedures that are stored in the service database system 124.

At block 256, the computing device may prompt the user to determine whether additional information is desired and/or requested. As described herein, additional information refers to information stored in the service database system 124 that is not included in the retrieved information from block 254. Indeed, the information included in the service log may not be sufficient for the user to complete the service, and thus, additional information may be obtained to facilitate completion of the service.

If additional information is not desired or requested, the service log may be updated as such, as indicated in block 258. In other words, the user may indicate in the service log that additional information was not desired to perform the service on the HVAC system 122. Specifically, the service on HVAC system 122 may be completed and the ticket is subsequently updated to indicate that the ticket is closed. In other words, a request associated with the ticket has been completed and no further services are desired. It should also be understood that in some instances, a request associated with the ticket may not be fully completed, but no further servicing may be performed at the time. In any case, the service log may be updated to reflect a progress of the service, as well as include a performed maintenance procedure, collected active operating data, determined or suspected active operating conditions, and/or other suitable information associated with the HVAC system 122. The updated service log may then be stored onto the service database system 124.

If additional information is requested, the processor 136 may query the service database system 124 for additional information, as shown at block 260. In other words, the additional information may be searchable within the service database system 124, such as via filtering information in the service database system 124 based on a particular service, a particular structure, a particular HVAC system 122, a particular date of service performed, and/or any other suitable information. As previously mentioned, information stored in the service database system 124 may also include feedback and/or reviews submitted by other users. The feedback and/or reviews may be viewable during the search, and thus, provide insight as to a relevance and/or usefulness of the additional information. In certain embodiments, when searching for additional information, search results may be sorted by specified categories, such as relevance, popularity, feedback, and/or another suitable category. Additionally or alternatively, the search results may be ranked by usefulness as assessed by other users to facilitate a user's selection of relevant information in the service database system 124. Thus, a user may search for additional information that may facilitate completion of the service on the HVAC system 122 in an effective and efficient manner.

Searching the additional information may enable the user to view information included in another service log stored in the service database system 124. Such information may include previous operating data of an HVAC system 122 and/or structure associated with the service log, a previous operating condition of the HVAC system 122 and/or structure associated with the service log, corresponding maintenance procedures, and/or other relevant information, which may enable a user to better perform the service on the HVAC system 122. In some embodiments, the user may modify and/or supplement the referenced additional information. For example, as previously described, the user may annotate and/or review the additional information. The annotations and reviews may enable other users viewing the additional information to determine if the additional information is valuable when performing a particular service. After querying the additional information, the service is performed in light of the queried additional information.

In some embodiments, additional information may be obtained and added into the service database system 124 manually through interactions between users. For example, if a user is not able to locate additional information in the service database system 124, the user may be able to ask other users to facilitate the performance of the service. The user may be able to view a list of other users stored in the service database system 124 and may be able to search and/or filter the list for a relevant user to contact. Specifically, the user may search and/or filter the list based on credentials, such as another user's experience and/or knowledge. In certain embodiments, feedback related to the other users may be provided, such as a helpfulness rating, and the feedback may be viewed by the user to determine which of the other users to contact to facilitate the performance of the service.

After performing the service with additional information, the service log may be updated, as shown at block 258. Specifically, in addition to updating the maintenance procedure, active operating data, and/or active operating conditions, information included in the service log may be updated to include modifications, additions, or other changes to information stored in the service database system 124, notes that may be relevant for future services, and/or other suitable information. Moreover, additional information obtained during the performance of the service may be incorporated into the service log information. For example, the user may cite, acknowledge, and/or include a previously performed maintenance procedure into the updated service log. Referencing the additional information may enable the additional information to be more accessible to other users by increasing a popularity and/or relevancy of the additional information. Additionally, at block 258, other information included in the service log, including information associated with the corresponding structure and/or general information may also be modified and/or updated as a result of completion of the service. Accordingly, the service database system 124 may include updated information that may be relevant in subsequent services.

Upon completion of the service, the service log and its associated information may be stored in the service database system 124 as an entry service log. After the entry service log is stored, the entry service log may become an existing service log in the service database system 124 and be viewable and queried by other users with access to the service database system 124. As such, other users may be able to reference information associated with the entry service log, such as an updated version of the maintenance procedure. Furthermore, after the entry service log is submitted or entered by a user, modifications made to the information associated with the structure and/or general information 216 may also be incorporated in the service database system 124. Thus, submitting entry service logs may cause the service database system 124 to add new information and to incorporate modifications to information already stored in the service database system 124. In additional or alternative embodiments, the user may not be capable of directly modifying pre-stored information in the service database system 124. Instead, the user may communicate with another member of the service network 150, such as the equipment distributor 156 and/or the OEM 158, to modify the pre-stored information.

In response to submission of the entry service log, the ticket and/or request may close. As such, the status of the service may be indicated as completed. As a result, information associated with the service performed as a result of the closed ticket may be blocked from being further modified, such as to avoid inadvertent changes to the information. Upon closing of the ticket and/or request, any additionally desired services to be performed on the corresponding structure may be submitted in a subsequent ticket and/or request.

Although this disclosure primarily describes the method 250 as being performed by a user via a computing device, it should be understood that the method 250 may additionally or alternatively be performed by any other entity with access to the service database system 124 and via any suitable electronic or computing device. Indeed, different entities may perform different steps of the method 250. For example, the OEM 158 may access existing service logs and provide the service company 152 with information retrieved from the service database system 124. Additionally, it should be understood that the steps of the method 250 may be performed in a different order than depicted. By way of example, a user may perform part of the service, query additional information to determine steps for completing another portion of the service, and perform the remaining part of the service after acquiring the additional information. It should be appreciated that additional steps not already mentioned may also be performed in the method 250.

As set forth herein, embodiments of the present disclosure may provide one or more technical effects useful in the operation and maintenance of HVAC systems. For example, a database, such as a cloud database, may be in communication with a plurality of electronic devices. The database may include information associated with service procedures and/or components of HVAC systems. When a service is requested, such as by a customer, a ticket or service log associated with the service may be created. The created ticket or service log may include information associated with the particular service, which may be modified by a user performing the service. The created service log may also include pre-stored information, such as information associated with the structure that the HVAC system is conditioning and/or other information generally associated with the HVAC system. A user may reference, review, and/or cite any of the pre-stored information in the created service log while performing the service to diagnose a condition of the HVAC system and/or facilitate performance of the service. In some embodiments, the user may also modify the pre-stored information and/or communicate with another entity to update information related to a maintenance procedure for performing the service, information related to the structure conditioned by the HVAC system, and/or information related to the HVAC system. Additionally, the user may be able to obtain additional information on the database by searching for other service logs that may include information relevant to the service that the user is performing. The user may also be able to search for contact information of other users on the database, which may enable the user to reach out to the other users to obtain information associated with the service. Upon completion of the service, the user may update and/or submit the entry service log to be stored on the database. As a result of the submission, the database may incorporate information associated with the service log, including any new information in the service log and/or modified information in the service log.

While only certain features and embodiments of the disclosure have been illustrated and described, many modifications and changes may occur to those skilled in the art, such as variations in sizes, dimensions, structures, shapes and proportions of the various elements, values of parameters, such as temperatures, pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A tangible, non-transitory, machine-readable medium, comprising instructions that, when executed by a processor, cause the processor to:
   receive sensor data comprising active operating data related to a heating, ventilation, and/or air conditioning (HVAC) system;
   determine an active operating condition based on the active operating data related to the HVAC system;
   retrieve a service log including a maintenance procedure corresponding to the active operating condition of the HVAC system, wherein the maintenance procedure comprises instructions for completing a service of the HVAC system;
   receive a user input comprising an update to the maintenance procedure; and
   modify the service log based on receipt of the user input, wherein the service log includes the active operating data, the active operating condition, and the update to the maintenance procedure received with the user input.

2. The tangible, non-transitory, machine-readable medium of claim 1, wherein the HVAC system is a first HVAC system, and wherein the service log includes information associated with a second HVAC system.

3. The tangible, non-transitory, machine-readable medium of claim 2, wherein the instructions, when executed by the processor, are configured to cause the processor to:
determine an additional active operating condition of the HVAC system based on additional active operating data related to the HVAC system.

4. The tangible, non-transitory, machine-readable medium of claim 3, wherein the instructions, when executed by the processor, are configured to cause the processor to modify the service log to include the additional active operating data, the additional active operating condition, and an additional update to the maintenance procedure, wherein the additional update to the maintenance procedure is based on additional user input.

5. The tangible, non-transitory, machine-readable medium of claim 1, wherein the instructions, when executed by the processor, are configured to cause the processor to:
receive a request for additional information;
search a database to identify a user associated with the active operating data, the active operating condition, the maintenance procedure, the HVAC system, or any combination thereof in response to receipt of the request; and
present contact information associated with the user.

6. The tangible, non-transitory, machine-readable medium of claim 1, wherein the instructions, when executed by the processor, are configured to cause the processor to retrieve previous operating data of the HVAC system, a previous operating condition of the HVAC system, a previous maintenance procedure performed on the HVAC system, or any combination thereof.

7. The tangible, non-transitory, machine-readable medium of claim 1, wherein the update to the maintenance procedure comprises a modification to the maintenance procedure, a review of the maintenance procedure, a new maintenance procedure, or any combination thereof.

8. The tangible, non-transitory, machine-readable medium of claim 1, wherein the instructions, when executed by the processor, are configured to cause the processor to receive the sensor data from an operating database of the HVAC system.

9. The tangible, non-transitory, machine-readable medium of claim 1, wherein the instructions, when executed by the processor, are configured to cause the processor to receive the sensor data via a quick response code or an identifier associated with the HVAC system.

10. The tangible, non-transitory, machine-readable medium of claim 1, wherein the service log is recorded in a database, and the database comprises a plurality of service logs including the service log.

11. A heating, ventilation, and/or air conditioning (HVAC) system, comprising:
a service database configured to store a service log, wherein the service log is associated with a plurality of HVAC systems comprising the HVAC system; and
a computing device configured to:
receive sensor data comprising active operating data associated with the HVAC system;
automatically determine an active operating condition of the HVAC system based on the active operating data of the sensor data;
receive a request to retrieve information related to a maintenance procedure from the service database;
retrieve the service log from the service database in response to receipt of the request, wherein the service log includes previous operating data of an additional HVAC system of the plurality of HVAC systems, a previous operating condition of the additional HVAC system, and a previous maintenance procedure corresponding to the previous operating condition and to the maintenance procedure of the request, wherein the previous maintenance procedure comprises steps for completing a previous service related to the additional HVAC system;
receive a user input comprising a modified version of the previous maintenance procedure;
update the service log to modify the previous maintenance procedure based on the modified version of the previous maintenance procedure received via the user input; and
send the service log to the service database for storage, wherein the service log includes the active operating data, the active operating condition, and the modified version of the previous maintenance procedure.

12. The HVAC system of claim 11, wherein the active operating data includes energy consumption to operate the HVAC system, a position of a component of the HVAC system, a property of a working fluid of the HVAC system, a property of an airflow of the HVAC system, or any combination thereof.

13. The HVAC system of claim 11, wherein the computing device is configured to receive the sensor data by scanning a quick response code or identifier of the HVAC system.

14. The HVAC system of claim 11, further comprising sensors configured to transmit the sensor data to the computing device.

15. The HVAC system of claim 11, comprising a control system having an operating database, wherein the control system is configured to store the active operating data associated with the HVAC system in the operating database, and the computing device is configured to receive the active operating data from the operating database.

16. A heating, ventilation, and/or air conditioning (HVAC) system, comprising:
a computing device configured to:
retrieve active operating data associated with the HVAC system;
determine an active operating condition of the HVAC system based on the active operating data;
compare the active operating condition to a service log, wherein the service log is associated with a plurality of HVAC systems including the HVAC system, each HVAC system of the plurality of HVAC systems is located at a different geographical location relative to one another, and the service log comprises a plurality of maintenance procedures;
identify a previous maintenance procedure of the service log based on the comparison of the active operating condition to the service log;
receive a user input comprising an update to the previous maintenance procedure; and
modify the service log to include the active operating data, the active operating condition, and the update to the previous maintenance procedure received via the user input.

17. The HVAC system of claim 16, wherein the computing device is configured to retrieve additional operating data associated with an additional HVAC system of the plurality of HVAC systems, determine an additional active operating condition of the additional HVAC system based on the additional operating data, compare the additional active operating condition to the service log, and identify an additional previous maintenance procedure of the service log based on the comparison of the additional active operating condition to the service log.

18. The HVAC system of claim 17, wherein the computing device is configured to update the additional operating data, the additional active operating condition, the additional previous maintenance procedure, or any combination thereof, based on the user input.

19. The HVAC system of claim 16, wherein the computing device is configured to update the active operating data, the active operating condition, or both based on the user input.

20. The HVAC system of claim 16, wherein the active operating data is first active operating data, the active operating condition is a first active operating condition, the previous maintenance procedure is a first maintenance procedure, and wherein the computing device is configured to:
    retrieve second active operating data associated with the HVAC system;
    determine a second active operating condition of the HVAC system based on the second active operating data associated with the HVAC system;
    retrieve the first maintenance procedure; and
    modify the service log to include the second active operating data, the second active operating condition, and a second maintenance procedure associated with the second active operating condition.

21. The HVAC system of claim 20, wherein the second maintenance procedure is based on the first maintenance procedure.

22. The HVAC system of claim 16, wherein the computing device is configured to receive a first input via a control system of the HVAC system, receive a second input from sensors of the HVAC system, or both.

23. The HVAC system of claim 16, wherein the computing device is configured to retrieve information of a user familiar with the active operating data, the active operating condition, the update to the previous maintenance procedure, the HVAC system, or any combination thereof.

24. The HVAC system of claim 16, further comprising:
    an operating database having the active operating data associated with the HVAC system; and
    a service database having the service log.

* * * * *